(12) United States Patent
Wildermuth et al.

(10) Patent No.: US 8,104,518 B2
(45) Date of Patent: Jan. 31, 2012

(54) CORRUGATED HOSE PIPE ASSEMBLY AND METHOD OF MAKING THE SAME

(75) Inventors: Andreas Wildermuth, Marbach (DE); Josef Steinbeck, Backnang (DE)

(73) Assignee: ConiTech Kuehner GmbH & Cie KG, Oppenweiler (DE)

( * ) Notice: Subject to any disclaimer, the term of this patent is extended or adjusted under 35 U.S.C. 154(b) by 81 days.

(21) Appl. No.: 12/662,167

(22) Filed: Apr. 2, 2010

(65) Prior Publication Data

US 2010/0229994 A1 Sep. 16, 2010

Related U.S. Application Data

(63) Continuation of application No. PCT/EP2008/061655, filed on Sep. 4, 2008.

(30) Foreign Application Priority Data

Oct. 4, 2007 (DE) .......................... 10 2007 047 495

(51) Int. Cl.
 *F16L 11/00* (2006.01)
 *F16L 33/00* (2006.01)

(52) U.S. Cl. ........ 138/109; 138/121; 285/256; 285/242; 285/903

(58) Field of Classification Search ................. 138/121, 138/122, 109; 285/256, 242, 255, 259, 903
See application file for complete search history.

(56) References Cited

U.S. PATENT DOCUMENTS

| | | | | |
|---|---|---|---|---|
| 4,522,435 A * | 6/1985 | Miller et al. | ................... | 285/256 |
| 4,657,285 A * | 4/1987 | Akiyama et al. | .............. | 285/256 |
| 4,705,304 A * | 11/1987 | Matsuda et al. | .............. | 285/243 |
| 5,209,267 A * | 5/1993 | Morin | ........................... | 138/109 |
| 5,349,988 A * | 9/1994 | Walsh et al. | ................... | 138/109 |
| 5,413,147 A * | 5/1995 | Moreiras et al. | .............. | 138/109 |
| 6,761,188 B1 | 7/2004 | Besche et al. | | |
| 6,773,038 B2 * | 8/2004 | Villano et al. | ................. | 285/256 |
| 7,021,673 B2 | 4/2006 | Furuta et al. | | |
| 7,104,285 B2 * | 9/2006 | Furuta | ........................... | 138/121 |
| 7,114,526 B2 * | 10/2006 | Takagi et al. | .................. | 138/127 |
| 7,661,720 B2 * | 2/2010 | Nakano et al. | ................. | 285/242 |
| 7,819,437 B2 * | 10/2010 | Weil et al. | ..................... | 285/256 |
| 7,849,884 B2 * | 12/2010 | Dickel | ........................... | 138/109 |
| 2007/0079885 A1 | 4/2007 | Zaborszki et al. | | |

* cited by examiner

*Primary Examiner* — Patrick F Brinson
(74) *Attorney, Agent, or Firm* — Walter Ottesen

(57) ABSTRACT

A corrugated hose pipe assembly has a corrugated pipe that is surrounded by an elastomeric high-pressure hose. The ends of the high-pressure hose are grasped and fixed by connectors. The connectors each have a pipe piece (210, 220) which is fitted with a circumferential, radially projecting stationary nipple stop (211, 221) at the axial end thereof facing the corrugated pipe. A hose nipple (310, 320), which is positively mounted on each pipe piece (210, 220), is provided with a radially protruding, circumferential hose stop (311, 321) at the end of the hose nipple (310, 320).

15 Claims, 2 Drawing Sheets

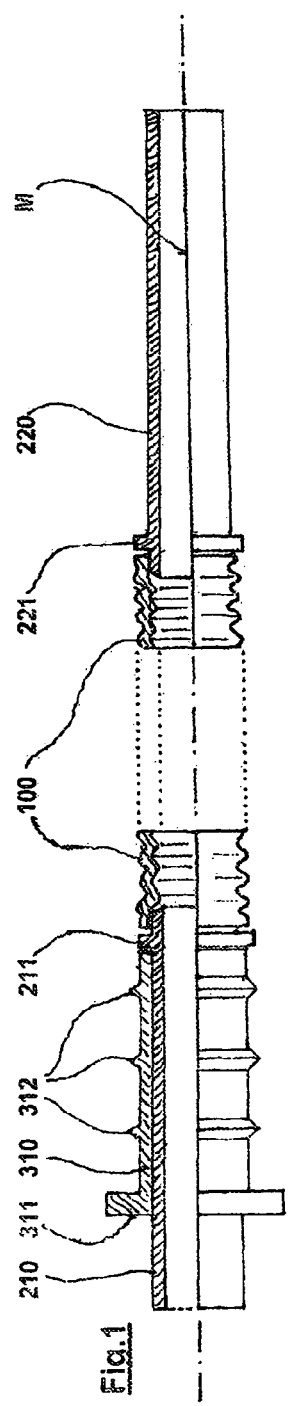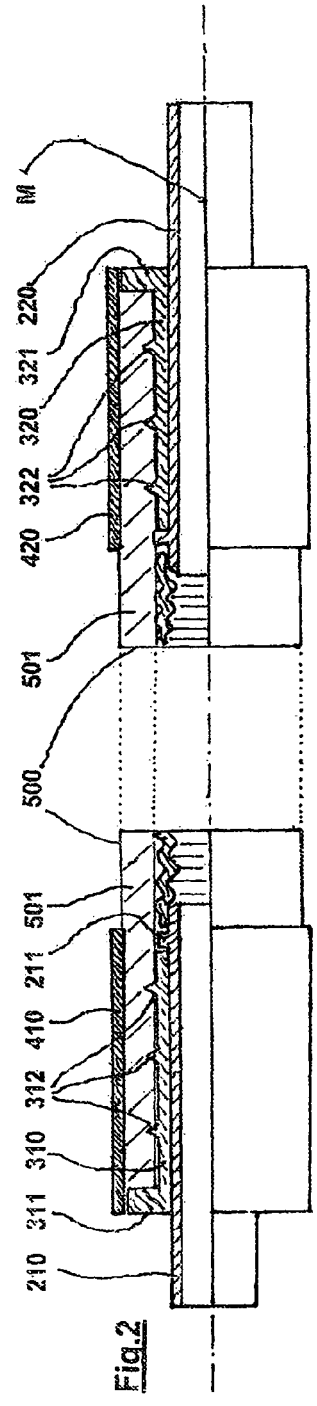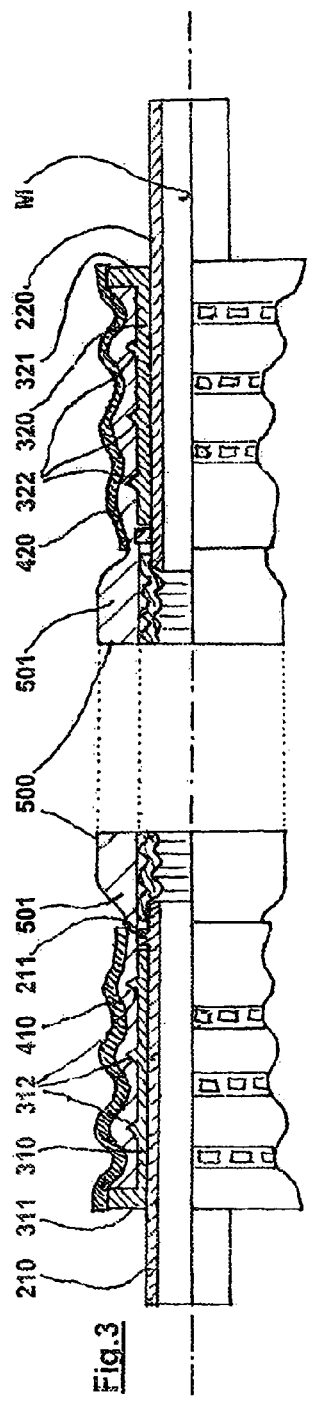

CORRUGATED HOSE PIPE ASSEMBLY AND METHOD OF MAKING THE SAME

CROSS REFERENCE TO RELATED APPLICATIONS

This application is a continuation application of international patent application PCT/EP 2008/061655, filed Sep. 4, 2008, designating the United States and claiming priority from German application 10 2007 047 495.6, filed Oct. 4, 2007, and the entire content of both applications is incorporated herein by reference.

FIELD OF THE INVENTION

The invention relates to flexible corrugated hose pipe assemblies that are suitable for conducting liquid or gaseous media, in particular pressurized liquid or gaseous media. Such hose assemblies are known, for example, from U.S. Pat. No. 6,761,188 and have a preferably metallic corrugated pipe as the inner core, the two ends of which are connected in a pressure-tight manner to suitable connectors. The corrugated pipe is surrounded by an elastomeric high-pressure hose. They are used on a large scale in automotive engineering, where over long periods of time (that is, where possible over the entire service life of the connected units), they have to withstand high alternating loads as to pressure and temperature even under extreme operating conditions. In this case, their reliability of operation is of vital importance to the traffic safety of the vehicles equipped therewith.

BACKGROUND OF THE INVENTION

In corrugated hose pipes known up to now, there has been a problem with respect to design and manufacture to assemble the hose pipes in assembly line production in such a manner as to ensure that all the dimensions and the optimum positioning of the components one relative to another were precisely reproducible and that the components were not already damaged during assembly. The subsequent occurrence of defects promoted by incorrect assembly also had to be avoided. For example, the corrugated pipe forming the inside of the pipe wall could be so damaged by excessive compression or stretching that cracks or fractures resulted immediately or during later use. In addition, by exceeding the cut length tolerances both of the corrugated pipe and of the high-pressure hose, material stresses could occur in the pipe or hose wall that resulted in defects over time.

SUMMARY OF THE INVENTION

It is the object of the invention to provide a structurally improved corrugated hose pipe assembly and an optimized method for its production. Here, it should be ensured that the pipe components (that is, the corrugated pipe, the high-pressure hose and the connectors) are positioned and secured one to another during assembly in a manner that is reproducible and that deviations in the length of the corrugated pipe and of the high-pressure hose are compensated for during assembly such that they do not affect the end product during practical operation. In addition, there was the requirement to indicate possibilities for reducing the production costs of the corrugated hose pipe assembly.

The corrugated hose pipe assembly of the invention includes: a corrugated pipe having first and second ends; an elastomeric high-pressure hose surrounding the corrugated pipe and having first and second end regions defining respective end faces; first and second pipe pieces having respective first ends fixedly connected pressure tight to corresponding ones of the first and second ends of the corrugated pipe; the first and second pipe pieces having respective peripheral, radially projecting fixed nipple stops at the first ends; the first and second pipe pieces having respective free second ends; first and second hose nipples supported form tightly on corresponding ones of the pipe pieces; each one of the hose nipples being pushed from the free second end of one of the pipe pieces up to the nipple stop thereof thereby axially positioning the hose nipple; each one of the hose nipples having an end facing toward the free second end of the pipe piece on which it is mounted; each one of the hose nipples having a peripheral, radially projecting hose stop at the end thereof; the hose stop having a diameter corresponding approximately to the diameter of the elastomeric high-pressure hose and being in contact engagement with a corresponding one of the end faces of the elastomeric high-pressure hose; the first and second hose nipples extending into the elastomeric high-pressure hose at corresponding ones of the first and second end regions thereof; first and second crimp sleeves encompassing corresponding ones of the first and second end regions of the elastomeric high-pressure hose; and, the first and second crimp sleeves being concentrically pressed so as to fix the first and second end regions of the elastomeric high-pressure hose onto corresponding ones of the first and second hose nipples.

An embodiment of a method of making the corrugated hose pipe assembly includes the steps of: providing first and second pipe pieces having respective first ends and respective peripheral, radially projecting fixed nipple stops at the first ends and the first and second pipe pieces having respective free second ends; providing a corrugated pipe of predetermined length having first and second ends; fixedly connecting the first and second ends of the corrugated pipe pressure tight to corresponding ones of the first ends of the pipe pieces; providing an elastomeric high-pressure hose having first and second end regions defining respective end faces; providing first and second hose nipples with each one of the hose nipples having a peripheral, radially projecting, collar-like hose stop at one end thereof and an end face at the other end thereof; pushing the first end region of the elastomeric high-pressure hose onto the first hose nipple so as to cause the end face of the first end region to abut the hose stop of the first hose nipple; compressing the elastomeric high-pressure hose to widen the same and, with its free end leading, pushing the elastomeric high-pressure hose over the first pipe piece onto the corrugated pipe until the other end of the first hose nipple abuts the nipple stop of the first pipe piece; pushing the second hose nipple onto the second pipe piece from the free second end thereof and introducing the second hose nipple into the second end region until the hose stop abuts the end face thereof while, at the same time, the other end of the second hose nipple is pushed to the nipple stop of the second pipe piece; pushing first and second crimp sleeves onto the first and second end regions of the elastomeric high-pressure hose so that they encompass the first and second hose nipples, respectively; and, concentrically pressing and permanently deforming the first and second crimp sleeves so as to axially fix the first and second end regions onto corresponding ones of the first and second hose nipples.

The present invention proceeds from a corrugated hose pipe of the type known from U.S. Pat. No. 6,761,188 which has a corrugated pipe that is enclosed by an elastomeric high-pressure hose and is connected to connectors in a pressure-tight manner at its axial ends. The ends of the high-pressure hose are held and secured by the connectors.

BRIEF DESCRIPTION OF THE DRAWINGS

The invention will now be described with reference to the drawings wherein:

FIG. 1 shows, as part of the invention, a corrugated pipe which has, at its respective ends, pipe pieces fixedly connected thereto;

FIG. 2 shows the same corrugated pipe with the connected pipe pieces, supplemented by a high-pressure hose that surrounds the corrugated pipe and by a hose nipple inserted into each of the ends of the high-pressure hose and a cylindrical sleeve surrounding each of the ends of the high-pressure hose;

FIG. 3 shows a complete corrugated hose pipe assembly according to the invention which differs from the intermediate product shown in FIG. 2 in that the two originally cylindrical sleeves are radially deformed; and, FIG. 4 shows a two-part variant of a hose nipple that is particularly advantageous within the context of the present invention and according to another embodiment thereof.

DESCRIPTION OF THE PREFERRED EMBODIMENTS OF THE INVENTION

Figure 4:
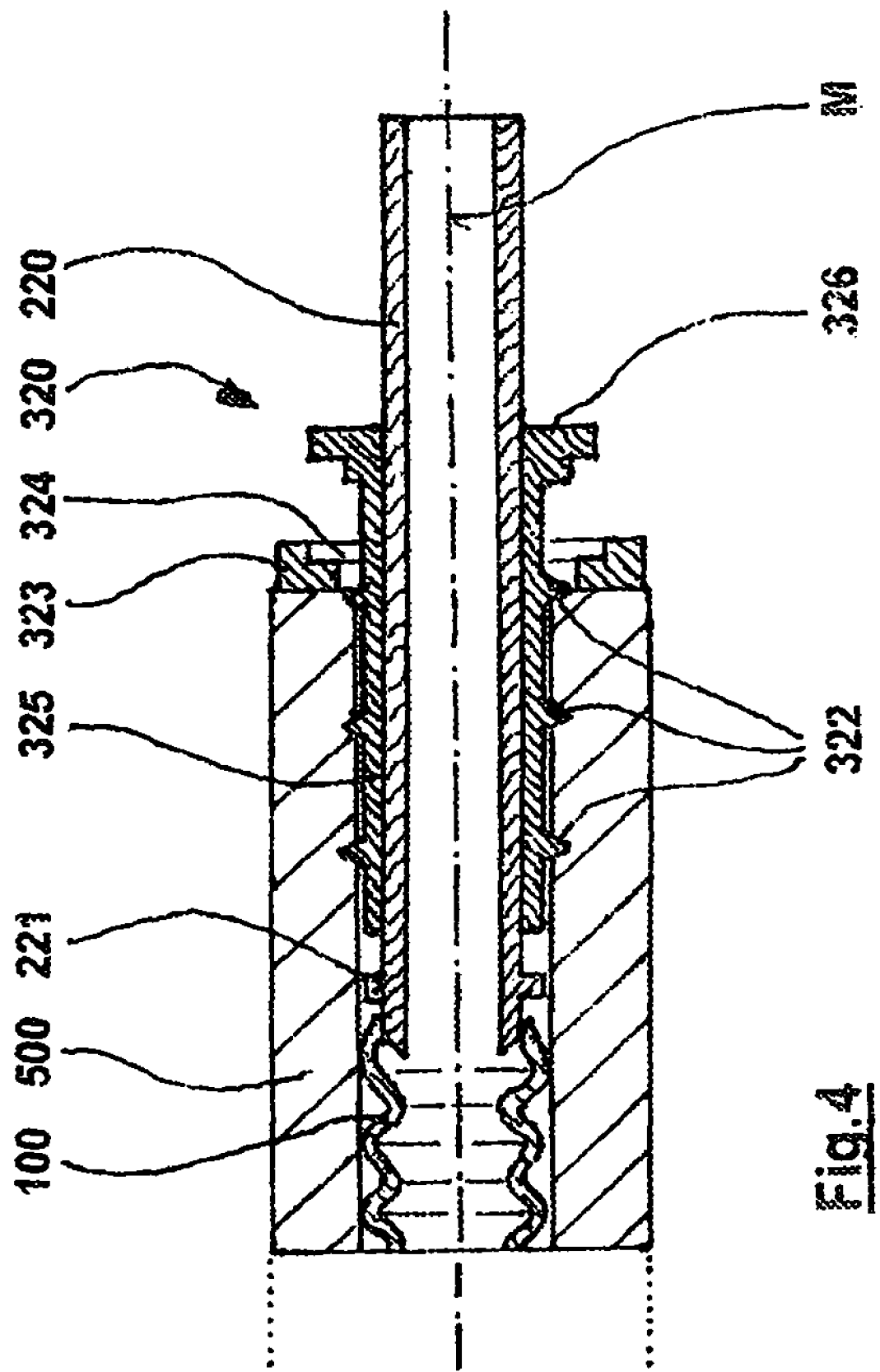

As shown in FIG. 1, a corrugated hose pipe assembly according to the invention has, in a manner known per se, a corrugated pipe 100, in particular a metal corrugated pipe. The ends of the corrugated pipe are connected fixedly and in a pressure-tight manner to pipe pieces 210 and 220, respectively. The connections can be established, for example, by soldering, welding or adhesive bonding. According to the invention, the pipe pieces 210 and 220 have collar-like radial projections at a small axial distance from their connections to the corrugated pipe 100. The radial projections function as nipple stops 211 and 221 by determining precisely how far the hose nipples 310 and 320 can be pushed and should be pushed toward the ends of the corrugated pipe 100. The hose nipples (310, 320) can be slipped from the free ends of the pipe pieces 210 and 220 in a form-tight manner onto the pipe pieces (see FIG. 2).

According to the invention, the hose nipples 310 and 320 each have, at their ends remote from the nipple stops 211 and 221, a radially protruding collar. The collars, as hose stops 311 or 321, establish precisely how far the high-pressure hose 500 surrounding the corrugated pipe 100 can be pushed and should be pushed onto the corresponding hose nipple.

In this way, the present invention provides the structural prerequisites for the situation where a precise axial measure of length for the high-pressure hose 500 (namely, the axial distance between the hose stops 311 and 321) can be predetermined as installation standard and consequently the cut length of the high-pressure hose 500 can be optimized in coordination with the length of the corrugated pipe. This is so because of the nipple stops 211 and 221, which provide for the precise positioning of the hose nipples (310, 320) on the pipe pieces, and because of the hose stops 311 and 321 which bring about the precise positioning of the ends of the high-pressure hose 500. For this reason, the corrugated hose pipe is optimized overall with reference to wear and intended function.

As pressure-absorbing means, the high-pressure hose 500 preferably includes steel wire braiding embedded in its wall 501. Within the context of the present invention, angles of 30° to 40° are preferred as braid angles.

According to the invention, on corrugated hose pipe assemblies in the finished state, the axial distance between the hose stops 311 and 321 is preferably less than the cut length of the high-pressure hose, that is, the high-pressure hose is axially compressed in a corresponding manner during assembly. In this case, compression by 5 to 10% of the cut length of the high-pressure hose has proven optimum. The compression ensures, in particular, that the high-pressure hose is seated without axial play and thus is fixed in a precisely positioned manner.

In the corrugated hose pipe assemblies according to the invention, it has proven especially practical with reference to the compression of the high-pressure hose to integrally mold circumferential clamping ribs 312 and 322 onto the hose nipples 310 and 320 in order to fix the end regions of the high-pressure hose 500 securely in an axial manner over the long term. The circumferential clamping ribs are known per se and protrude radially outward and are axially spaced one from the other. The end regions of the high-pressure hose 500 are pressed against the hose nipples by the crimp sleeves 410 and 420.

The crimp sleeves 410 and 420 are preferably formed from smooth-walled cylindrical sections 411 and 421 of drawn metal tubes and can therefore be produced in a very cost-effective manner. By cold forming, the crimp sleeves are narrowed radially such that they press the end regions of the elastomeric hose wall 501, which they surround, together with the reinforcement embedded in the wall, in a concentric manner against the hose nipples 310 or 320 and in particular against the circumferential clamping ribs 312 or 322 thereof, thereby fixing the hose ends so that they are immovable.

The axial length of the crimp sleeves 410 and 420 extends from the hose nipples 310 and 320 to beyond the nipple stops 211 or 221 and the ends of the corrugated pipe 100. The crimp sleeves 410 and 420 have, offset relative to the circumferential clamping ribs 312 and 322 of the hose nipples 310 or 320, constrictions which are produced during the concentric compression of the crimp sleeves and which increase the contact pressure acting on the clamped hose wall 501 such that the ends of the high-pressure hose 500 are securely fastened.

In one embodiment of the invention that is particularly advantageous with respect to both design and process, at least one of the two hose nipples used is realized in at least two parts, such as shown schematically by the embodiment of FIG. 4. An apertured disc 323 acts as hose stop in this embodiment with its outer diameter corresponding approximately to the diameter of the high-pressure hose 500. The nipple body 325 can be pushed through the hole 324 in the apertured disc up to an end stop 326 that is integrally molded on the nipple body and, in so doing, can be inserted into the high-pressure hose 500. The required position is achieved when the nipple body 325 abuts, on the one hand, against the nipple stop 221 and, on the other hand, the end stop 326 is seated in a form-tight manner in the hole 324.

Because of the structural configuration according to the invention of the connectors of the corrugated hose pipe, the invention makes it possible to use aluminum or aluminum alloys as the material for essential parts of the connectors, in particular for the hose nipples 310 and 320 and for the crimp sleeves 410 and 420. Aluminum or aluminum alloys are used in lieu of the high-quality steel used up to now thereby achieving a considerable cost savings.

In the method, the compression according to the invention of the high-pressure hose affords the following advantages. The high-pressure hose is inexorably widened during the compression process, and this means that the corrugated pipe in the interior of the high-pressure hose can shift axially such that the axial forces acting on the corrugated pipe wall are distributed and evened out over the entire pipe length. In this way, in particular, the occurrence of locally excessive axial forces can be prevented which could cause fractures in the wall. Also, exceeding the cut length tolerances of the corrugated pipe and the high-pressure hose are also compensated for the most part in this manner because they are always distributed over the entire length of corrugated pipe and do not result in axially narrowly restricted compressions or stretchings of the corrugated pipe with resultant fractures in the corrugated pipe wall.

It is understood that the foregoing description is that of the preferred embodiments of the invention and that various changes and modifications may be made thereto without departing from the spirit and scope of the invention as defined in the appended claims.

LIST OF REFERENCES

Part of the Description

100 Corrugated pipe
210 Pipe piece
211 Nipple stop
220 Pipe piece
221 Nipple stop
310 Hose nipple
311 Hose stop
312 Circumferential clamping ribs
320 Hose nipple
321 Hose stop
322 Circumferential clamping ribs
323 Apertured disc
324 Hole in the apertured disc
325 Hose nipple body
326 End stop
410 Crimp sleeve
420 Crimp sleeve
500 High-pressure hose
501 Elastomer hose wall with embedded reinforcement
M Center axis (longitudinal axis)

What is claimed is:

1. A corrugated hose pipe assembly comprising:
a corrugated pipe having first and second ends;
an elastomeric high-pressure hose surrounding said corrugated pipe and having first and second end regions defining respective end faces;
first and second pipe pieces having respective first ends fixedly connected pressure tight to corresponding ones of said first and second ends of said corrugated pipe;
said first and second pipe pieces having respective peripheral, radially projecting fixed nipple stops at said first ends;
said first and second pipe pieces having respective free second ends;
first and second hose nipples supported form tightly on corresponding ones of said pipe pieces;
each one of said hose nipples being pushed from the free second end of one of said pipe pieces up to the nipple stop thereof thereby axially positioning the hose nipple;
each one of said hose nipples having an end facing toward the free second end of the pipe piece on which it is mounted;
each one of said hose nipples having a peripheral, radially projecting hose stop at said end thereof;
said hose stop having a diameter corresponding approximately to the diameter of said elastomeric high-pressure hose and being in contact engagement with a corresponding one of said end faces of said elastomeric high-pressure hose;
said first and second hose nipples extending into said elastomeric high-pressure hose at corresponding ones of said first and second end regions thereof;
first and second crimp sleeves encompassing corresponding ones of said first and second end regions of said elastomeric high-pressure hose; and,
said first and second crimp sleeves being concentrically pressed so as to fix said first and second end regions of said elastomeric high-pressure hose onto corresponding ones of said first and second hose nipples.

2. The corrugated hose pipe assembly of claim 1, wherein said elastomeric high-pressure hose has an elastomeric wall with reinforcement embedded therein; and, said reinforcement is in the form of steel wire braiding.

3. The corrugated hose pipe assembly of claim 2, wherein the braid angle of said steel wire braiding lies in a range of 30° to 40°.

4. The corrugated hose pipe assembly of claim 1, wherein said elastomeric high-pressure hose is cut to a predetermined length; said hose stops of said first and second hose nipples conjointly define an axial distance therebetween which is slightly less than said predetermined length; and, said elastomeric high-pressure hose is axially compressed when seated between said hose stops.

5. The corrugated hose pipe assembly of claim 4, wherein said elastomeric high-pressure hose is axially compressed by up to 5 to 10% of said predetermined length when seated between said hose stops.

6. The corrugated hose pipe assembly of claim 1, wherein each of said hose nipples has a plurality of peripheral, radially outwardly protruding clamping ribs; and, said clamping ribs are arranged so as to be axially spaced one from the other.

7. The corrugated hose pipe assembly of claim 1, wherein at least one of said first and second hose nipples is composed of first and second parts; said first part is formed as the hose stop and has an aperture formed therein; said second part is an elongated body having an end stop formed thereon; said elongated body is pushed through said aperture up to said end stop; and, said end stop is seated form tight in said aperture.

8. The corrugated hose pipe assembly of claim 2, wherein said first and second crimp sleeves comprise segments of a drawn metal tube and said first and second crimp sleeves are concentrically pressed together by cold forming causing said elastomeric wall to be pressed against and fixed on corresponding ones of said first and second hose nipples.

9. The corrugated hose pipe assembly of claim 1, wherein said first and second pipe pieces are made at least in part of aluminum or an aluminum alloy.

10. A method of making a corrugated hose pipe assembly, the method comprising the steps of:
providing first and second pipe pieces having respective first ends and respective peripheral, radially projecting fixed nipple stops at said first ends and said first and second pipe pieces having respective free second ends;
providing a corrugated pipe of predetermined length having first and second ends;
fixedly connecting said first and second ends of said corrugated pipe pressure tight to corresponding ones of said first ends of said pipe pieces;
providing an elastomeric high-pressure hose having first and second end regions defining respective end faces;
providing first and second hose nipples with each one of said hose nipples having a peripheral, radially projecting, collar-like hose stop at one end thereof and an end face at the other end thereof;

pushing said first end region of said elastomeric high-pressure hose onto said first hose nipple so as to cause the end face of said first end region to abut the hose stop of said first hose nipple;

compressing said elastomeric high-pressure hose to widen the same and, with its free end leading, pushing said elastomeric high-pressure hose over said first pipe piece onto said corrugated pipe until the other end of said first hose nipple abuts the nipple stop of said first pipe piece;

pushing said second hose nipple onto said second pipe piece from said free second end thereof and introducing said second hose nipple into said second end region until said hose stop abuts the end face thereof while, at the same time, the other end of said second hose nipple is pushed to the nipple stop of said second pipe piece;

pushing first and second crimp sleeves onto said first and second end regions of said elastomeric high-pressure hose so that they encompass said first and second hose nipples, respectively; and, concentrically pressing and permanently deforming said first and second crimp sleeves so as to axially fix said first and second end regions onto corresponding ones of said first and second hose nipples.

11. The method of claim 10, wherein said elastomeric high-pressure hose is axially compressed and thereby radially widened when said second hose nipple is introduced.

12. The method of claim 10, wherein the cut length tolerance of said elastomeric high-pressure hose and the length tolerance of said corrugated pipe are compensated during assembly in that said corrugated pipe is axially compressed by the difference between the actual cut length of said elastomeric high-pressure hose and the length of said corrugated pipe.

13. The method of claim 12, wherein said corrugated pipe and said first and second pipe pieces conjointly define a center axis; and, a kinking of said elastomeric high-pressure hose and/or of said corrugated pipe is avoided during axial compression by applying stiff form shells parallel to said center axis.

14. The method of claim 13, wherein said stiff form shells are half cylindrical form shells.

15. The method of claim 10, wherein said crimp sleeves are smooth walled cylindrical segments of a drawn metal tube.

* * * * *

UNITED STATES PATENT AND TRADEMARK OFFICE
CERTIFICATE OF CORRECTION

PATENT NO. : 8,104,518 B2  
APPLICATION NO. : 12/662167  
DATED : January 31, 2012  
INVENTOR(S) : Andreas Wildermuth et al.

Page 1 of 1

It is certified that error appears in the above-identified patent and that said Letters Patent is hereby corrected as shown below:

On the Title Page:
Under (73) Assignee: delete "ConiTech" and substitute -- ContiTech -- therefor.

Signed and Sealed this
Nineteenth Day of June, 2012

David J. Kappos
*Director of the United States Patent and Trademark Office*